UNITED STATES PATENT OFFICE.

CARL RACH, OF CHICAGO, ILLINOIS.

PREPARATION OF WORT FROM INDIAN CORN.

SPECIFICATION forming part of Letters Patent No. 500,294, dated June 27, 1893.

Application filed May 20, 1892. Serial No. 433,755. (No specimens.)

*To all whom it may concern:*

Be it known that I, CARL RACH, a subject of the King of Prussia, residing at Chicago, Cook county, Illinois, have invented a new and useful Improvement in the Preparation of Wort from Indian Corn, of which the following is a specification.

My invention relates to an improvement in the process for the preparation and production of wort from Indian corn or maize, and has for its object to provide means whereby a large quantity of wort may be obtained from the grain by the simplest process, and especially by the use of what is commonly described as hominy.

I first take a quantity of selected corn and run it through a splitting or breaking machine so that each kernel is broken into several pieces, thus separating the germ from the endosperm and in this process forming a certain quantity of flour. This product is then run through suitable separators until it is separated into three parts, the one consisting of the germs, which are of no further use in my method, the second of the coarse broken grain or hominy, and the third of the flour.

The first part of my invention proper consists in taking a quantity of the coarse grain or hominy and mixing the same with one-fifth of its weight with crushed malt. This mixture is then run into a closed steam vessel or cooker, in which there is a quantity of water, being from about eight-tenths to one barrel of water for every hundred pounds of hominy used. At the same time that this grain or mixture is being run into the cooker, steam is admitted directly into the vessel or cooker and by this means the temperature of the mixture of hominy, malt and water is very rapidly raised to the boiling point of 212° Fahrenheit. This vessel is preferably provided with a pressure gage, as is of course usually the case, and after the mixture has reached the boiling point its temperature is slowly raised by the use of steam or heat in any other manner above the boiling point and with such degree of rapidity as that the pressure will gradually increase or pass from zero up to fifteen pounds during the period of one hour, and this process of increasing the temperature and pressure is continued during the ensuing half hour until the pressure gage registers thirty pounds. This process of heating and increasing the pressure with diminished rapidity is continued until at the end of the next half hour the pressure gage will stand at about forty pounds. This corn mash or hominy mash is now ready to be mixed with the malt mash in the mash tub.

The second part of my invention or process consists in producing a flour mash while the hominy mash is being prepared, as above referred to.

In an iron tank provided with a stirring apparatus and steam pipes, to every one hundred pounds of flour produced by breaking and splitting the corn, one half barrel of water and one half barrel of a malt mash diastase liquid is mixed, the latter obtained by mixing one hundred pounds of crushed malt with one and one-third barrels of water and passing the liquid part of this mixture through a sieve. Steam is admitted until the temperature of this flour mash is slowly raised to about 167° Fahrenheit. This temperature is retained until all the starch is converted into dextrine and malt sugar. The temperature of the whole mash or mixture is then raised to 200° Fahrenheit, and the solid part of the mash is permitted to settle. The liquid part on top of the solid part of the mash is to be used in the manner hereinafter described.

The third part or step in my process, is the preparation of malt mash, which is accomplished in the usual manner, or say, by the mixing of one hundred pounds of malt with one and one-third barrels of water of ordinary temperature. A good wort may now be produced from a mixture of the hominy mash with a malt mash, the two being mixed in such quantities and such temperatures as to bring the whole to a temperature of from 163° to 167° Fahrenheit. A good wort may also be made by mixing the liquid part of the flour mash with the malt mash and stirring the whole in the mash tub for a suitable period of time, when the wort may be run off. I prefer, however, to get the full effect and benefit of my process, to add to the mixture of malt mash and hominy mash the liquid part of the flour mash and mix and stir the same in the mash tub, and then allow it to rest for forty minutes, after which time the wort may be run off ready for use.

Hominy, such as hereinbefore referred to, is a product consisting of a multitude of grains or particles which are somewhat roughened, or provided with surface depressions, or abraded and cut, owing to the manner of their preparation. Into these surface depressions the mixture with which the hominy is associated will pass. By "very rapidly," as applied to the heating up to 212° Fahrenheit, I mean a heating process which will extend over half an hour, though of course this time is capable of considerable variation, but the temperature is steadily raised with a certain degree of rapidity until it reaches about 212° Fahrenheit. During some or all of such period the effect of the mixture upon the hominy is both chemical and physical to gelatinize the hominy and produce a homogeneous mass of the whole. These hominy granules or particles, on account of their peculiarities above referred to, are taken in their dry condition. The action of the diastase of the malt on the hominy, when the hominy is in the condition above referred to, is to extend such surface depressions or penetrate the hominy particles and thus give the steam and the pressure, subsequently applied, opportunity to readily reduce the hominy. In the production or preparation of hominy a certain amount of flour is produced, and I desire to utilize both products. The flour cannot stand the high temperatures to which the hominy can safely be subjected, and hence the necessity and importance of treating them separately—the hominy being subjected to high temperatures and the flour under different conditions to lower temperatures, as above set forth. I have found by practical experience that when the flour and hominy are treated together the result is not nearly so satisfactory and in some instances the wort will practically refuse to run.

I mean in the use of the words "hominy mash" to include any mash by whatsoever means made from hominy since hominy has not heretofore been used to make mash.

I claim—

1. The process of producing wort from Indian corn, which consists in cracking or breaking the corn until hominy and flour are produced, then making a hominy mash, and a flour mash substantially in the manner described, then producing a malt mash in the manner substantially as described, then mixing the hominy mash and malt mash as indicated, then adding the flour mash and treating the same until the wort is produced.

2. The process of producing or preparing wort from Indian corn, which consists in producing from such corn hominy, then producing from such hominy a hominy mash by mixing such hominy with about one-fifth its weight in crushed malt, cooking same with water in the proportion of about a barrel of water to about one hundred pounds of hominy, then producing in the usual manner a malt mash, then mixing the hominy and malt mash and treating the same substantially as described until the wort is produced.

3. The process of producing wort from Indian corn, which consists in cracking or breaking the corn until hominy and flour are produced, then making a hominy mash, by mixing such hominy with about one-fifth its weight in crushed malt, cooking same with water in the proportion of about a barrel of water to about one hundred pounds of hominy, then making a flour mash substantially in the manner described, then producing a malt mash in the manner substantially as described, then mixing the hominy mash and malt mash as indicated, then adding the flour mash and treating the same until the wort is produced.

CARL RACH.

Witnesses:
WALTER J. GUNTHORP,
M. E. MOORE.